US007010274B2

(12) United States Patent
Choi

(10) Patent No.: US 7,010,274 B2
(45) Date of Patent: Mar. 7, 2006

(54) ANTENNA SWITCHING MODULE HAVING AMPLIFICATION FUNCTION

(75) Inventor: Joo Young Choi, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 391 days.

(21) Appl. No.: 10/396,466

(22) Filed: Mar. 26, 2003

(65) Prior Publication Data

US 2004/0116082 A1 Jun. 17, 2004

(30) Foreign Application Priority Data

Dec. 16, 2002 (KR) ...................... 10-2002-0080251

(51) Int. Cl.
*H04B 1/44* (2006.01)
*H04B 1/46* (2006.01)

(52) U.S. Cl. ........................... 455/83; 455/82; 333/101

(58) Field of Classification Search .................. 455/78, 455/79, 82, 83, 84, 269, 271; 333/100, 101, 333/103, 109, 112
See application file for complete search history.

(56) References Cited

U.S. PATENT DOCUMENTS 4,055,807 A 10/1977 Priniski et al.
5,054,114 A * 10/1991 Erickson ...................... 455/78
5,521,561 A * 5/1996 Yrjola et al. ............... 333/103
5,778,306 A * 7/1998 Kommrusch ................. 455/78
5,903,820 A * 5/1999 Hagstrom .................... 455/82
6,060,960 A * 5/2000 Tanaka et al. ................ 455/83
6,201,455 B1 3/2001 Kusunoki

OTHER PUBLICATIONS

Patent Abstracts of Japan—Publication No. 2002-290257, Published Oct. 4, 2002.
Patent Abstracts of Japan—Publication No. 10-126307, Published May 15, 1998.
Patent Abstracts of Japan—Publication No. 06-169266, Published Jun. 14, 1994.
Patent Abstracts of Japan—Publication No. 09-055681, Published Feb. 25, 1997.
Patent Abstracts of Japan—Publication No. 10-093470, Published Apr. 10, 1998.
Patent Abstracts of Japan—Publication No. 2002-050980, Published Feb. 15, 2002.
Patent Abstracts of Japan—Publication No. 2002-261650, Published Sep. 13, 2002.

* cited by examiner

*Primary Examiner*—Quochien B. Vuong
(74) *Attorney, Agent, or Firm*—Lowe Hauptman & Berner, LLP

(57) ABSTRACT

Disclosed herein is an antenna switching module having an amplification function, in which the power amplification of a transmission signal is performed together with the switching of transmission/reception signals to an antenna, using a basic antenna switching construction, thus reducing costs of mobile terminals and miniaturizing the mobile terminals.

The antenna switching module has an amplifier, a low pass filter, a transmission line, and a switching diode. The amplifier is implemented using at least one active element and a bias circuit to intercept or amplify a transmission signal applied through a transmission terminal, wherein the bias circuit drives the active element to be turned on/off in response to a control signal and determines an amplification factor. The low pass filter is disposed between the amplifier and the antenna terminal to eliminate harmonic frequency components included an output signal of the amplifier. The transmission line has a length of ¼ of a wavelength (λ) of a reception signal to connect the antenna terminal and the reception terminal to each other. The switching diode is disposed between a first end of the transmission line, connected to the reception terminal, and the ground, and is switched on/ff in response to the control signal.

5 Claims, 9 Drawing Sheets

ANTENNA SWITCHING MODULE HAVING AMPLIFICATION FUNCTION

BACKGROUND OF THE INVENTION

1. Field of the Invention

The present invention relates generally to an antenna switching module for transmitting/receiving RF signals through a single antenna in a mobile terminal, and more particularly to an antenna switching module having an amplification function, in which the power amplification of a transmission signal is performed together with the switching of transmission/reception signals to an antenna.

2. Description of the Prior Art

Generally, mobile terminals, such as cellular phones or Personal Digital Assistants (PDAs), are devices for transmitting/receiving data or voice signals through Radio Frequency (RF) channels without limitation of place. Most of mobile terminals employ a construction in which only a single antenna is mounted and transmission and reception terminals on a printed circuit board are alternately connected to the antenna, in consideration of external appearance or size restrictions.

Recently, with the miniaturization of mobile terminals, the development of RF parts for mobile terminals aims at miniaturization, modulization, and multi-function. Therefore, RF circuits connected to an antenna have been realized as modules. Of the modules, there is provided an Antenna Switching Module (ASM) in which a circuit, connected to the antenna to alternately switch the connections between two signals and the antenna, is realized as a module. Further, a Front End Module (FEM) in which a saw filter is further included at a side of a reception terminal of the ASM to filter a reception signal has been developed. Moreover, an attempt has been made to integrate the ASM and a Power Amplifier Module (PAM) for amplifying the power of a transmission signal to a transmission level into a single module.

FIGS. 1 and 2 are views showing the constructions of conventional antenna switching modules. As shown in FIGS. 1 and 2, each of antenna switching modules fundamentally comprises a low pass filter 11 or 21, a first switching diode 12 or 22, a transmission line 13 or 23, and a second switching diode 14 or 24. Each of the low pass filters 11 and 21 eliminates harmonic frequency components included in a transmission signal received from a transmission terminal TX. Each of the first switching diodes 12 and 22 connects or disconnects a transmission signal path from the transmission terminal TX to an antenna terminal ANT. Each of the transmission lines 13 and 23 connects between the antenna terminal ANT and a reception terminal RX and has a length of λ/4 (λ: wavelength of a reception signal). Each of the second switching diodes 14 and 24 connects or disconnects a reception signal path from the antenna terminal ANT to the reception terminal RX.

In the above constructions, depending on the connecting directions of the first and second switching diodes 12, 14, 22 and 24, constructions required to apply a control signal Vc for controlling on/off states of the first and second switching diodes 12, 14, 22 and 24, are different, as shown in FIGS. 1 and 2.

That is, in case of the antenna switching module of FIG. 1, if a high level control signal Vc is applied to an anode of the first switching diode 12, the first switching diode 12 is turned on, and the second switching diode 14 whose cathode is grounded is also turned on. At this time, a path ranging from the transmission terminal TX to the antenna terminal ANT through the low pass filter 11 is formed with respect to a transmission signal. Further, a path ranging from the antenna terminal ANT to the ground through the transmission line 13 is formed with respect to a reception signal. Therefore, the transmission signal is transmitted through the antenna terminal ANT, and the reception signal is bypassed to the ground and is not transferred to the reception terminal RX.

On the other hand, if a low level control signal Vc is applied to the anode of the first switching diode 12, the first and second switching diodes 12 and 14 are turned off, so the path between the antenna unit ANT and the transmission terminal TX is disconnected, and a path ranging from the antenna terminal ANT to the reception terminal RX is formed. Therefore, a reception signal received through the antenna terminal ANT is transferred to the reception terminal RX through the transmission line 13.

Further, in case of the antenna switching module shown in FIG. 2, if a high level control signal Vc is applied to an anode of the second switching diode 24, the second switching diode 24 and the first switching diode 22 are turned on, so a signal path ranging from the transmission terminal TX to the antenna terminal ANT is formed. At this time, a reception signal is bypassed to the ground and is not transferred to the reception terminal RX. On the contrary, if a low level control signal Vc is applied to the anode of the second switching diode 24, the second and first switching diodes 24 and 22 are turned off, so a signal path ranging from the antenna terminal ANT to the reception terminal RX is formed. In this case, each of the low pass filters 11 and 21 performs the functions of eliminating unnecessary harmonic frequency components generated from a power amplifier module (not shown) located at its previous stage and transmitting only a transmission signal to the antenna terminal ANT. The transmission lines 13 and 23 are tuned to reception frequency bands to prevent a high power transmission signal from flowing into the reception terminal RX.

Therefore, a mobile terminal equipped with the antenna switching module having the above construction applies a clock signal in which a mark and a space appear to the antenna switching module as a control signal (Vc) to operate transmission and reception modes in a time division manner, thus performing transmission and reception.

If these conventional antenna switching modules are used, a mobile terminal must prepare an additional power amplifier module for amplifying a transmission signal at a previous stage of a transmission terminal of the antenna switching module, which hinders the miniaturization of mobile terminals.

Therefore, attempts to implement the antenna switching module and the power amplifier module as a single part have been made.

As one of such attempts, FIG. 3 is a view showing a conventional module in which the ASM and the PAM are implemented as a single package. In this case, respective ASM and PAM circuits are mounted on a single Low Temperature Co-fired Ceramic (LTCC) board while the constructions of a conventional PAM 32 and a conventional ASM 31 are maintained as they are, thus implementing the conventional module of FIG. 3.

In the conventional module, it is difficult to expect a size reduction effect, because the PAM and the ASM are merely implemented as a single package, but the conventional PAM and ASM circuits are maintained as they are.

SUMMARY OF THE INVENTION

Accordingly, the present invention has been made keeping in mind the above problems occurring in the prior art, and an object of the present invention is to provide an antenna switching module having an amplification function, which is implemented as a basic antenna switching circuit without using an additional circuit, thus performing the power amplification of a transmission signal, as well as the switching of transmission/reception signals to an antenna.

Another object of the present invention is to provide an antenna switching module having an amplification function, in which the amplification burden of a power amplifier is partially allocated to the antenna switching module to perform amplification, such that the power amplifier is miniaturized, or in which the power amplifier can be removed if the antenna switching module fully performs a function of the power amplifier itself, thus reducing the costs of mobile terminals and miniaturizing the mobile terminals.

In order to accomplish the above object, the present invention provides an antenna switching module having an amplification function for selectively connecting an antenna terminal to any of a transmission terminal and a reception terminal, comprising an amplifier comprising at least one active element and a bias circuit for intercepting or amplifying a transmission signal applied through the transmission terminal, the bias circuit driving the active element to be turned on/off in response to a control signal and determining an amplification factor; a low pass filter and matching circuit unit disposed between the amplifier and the antenna terminal to eliminate harmonic frequency components included an output signal of the amplifier and perform signal matching; a transmission line having a length of ¼ of a wavelength (λ) of a reception signal to connect the antenna terminal and the reception terminal to each other; and a switching diode disposed between a first end of the transmission line, connected to the reception terminal, and the ground, and switched on/ff in response to the control signal.

Further, in the antenna switching module of the present invention, the amplifier uses one or more bipolar junction transistors connected to each other as the active element for switching and amplification.

Further, in the antenna switching module of the present invention, the amplifier uses one or more field effect transistors connected to each other as the active element for switching and amplification.

Moreover, in the antenna switching module of the present invention, the low pass filter and matching circuit unit is constructed such that a low pass filter is disposed between said antenna terminal and a contact point of said amplifier and said transmission line, and a matching circuit is connected to an output terminal of the amplifier.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the construction and operation of an antenna switching module according to the present invention will be described in detail with reference to the attached drawings.

Figure 4:
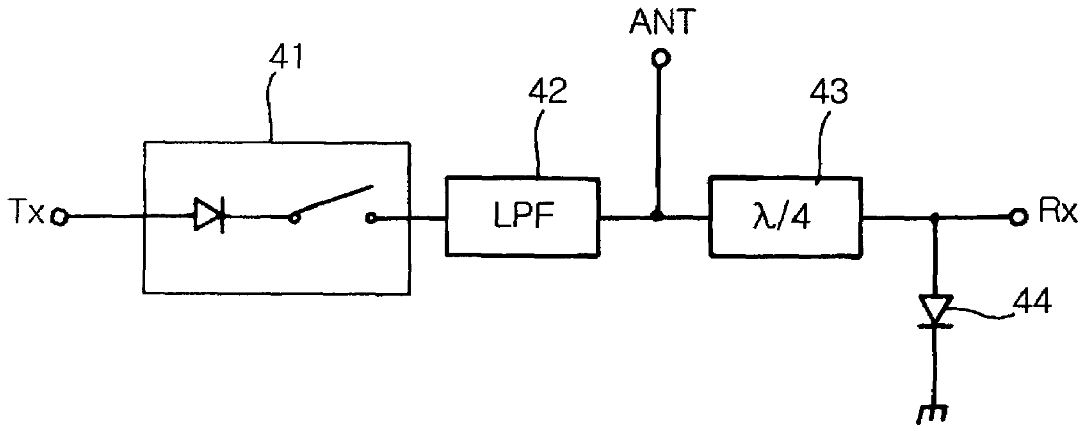
FIG. 4 is a conceptual view showing an antenna switching module according to the present invention.

FIG. 4 is a conceptual view showing an antenna switching module according to the present invention.

Referring to FIG. 4, the antenna switching module of the present invention comprises a switching means 41, a low pass filter 42, a transmission line 43, and a switching diode 44. The switching means 41 amplifies a transmission signal received from a transmission terminal TX to a predetermined level, and has an amplification function which is switched on/off. The low pass filter 42 is disposed between the switching means 41 having the amplification function and an antenna terminal ANT to eliminate unnecessary harmonic frequency components included in the transmission signal and transmit the transmission signal from which harmonic components have been eliminated to the antenna terminal ANT. The transmission line 43 has a length of λ/4 (λ: wavelength of a reception signal) and connects the antenna terminal ANT and a reception terminal RX to each other. The switching diode 44 is disposed between one end of the transmission line 43, connected to the reception terminal RX, and the ground to operate to be switched on/off.

The above elements are implemented as a single module, and switching on/off operations of both the switching means 41 having the amplification function and the switching diode 44 are controlled in response to a low or high level control signal applied from the outside the module.

Figure 1:
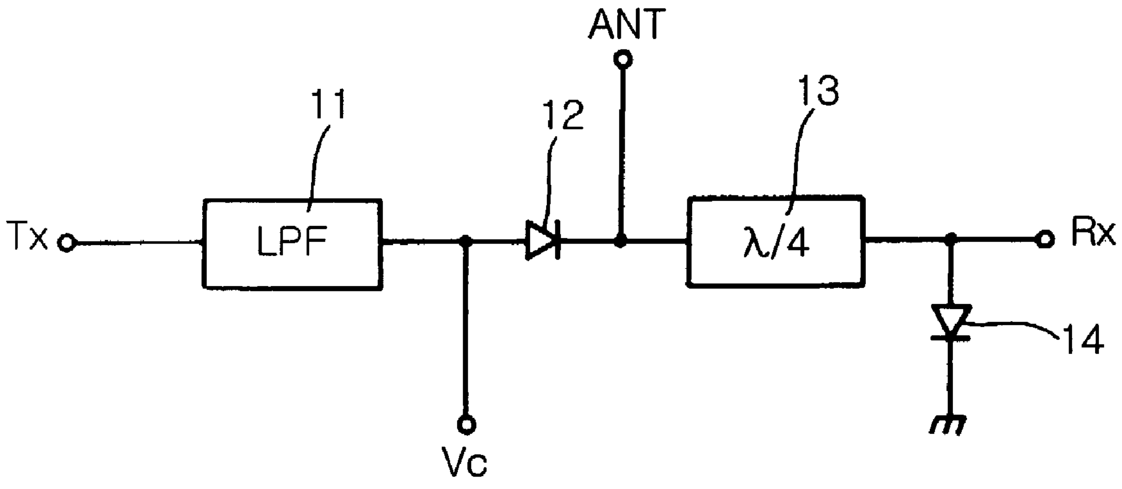
FIG. 1 PRIOR ART
FIG. 1 is a circuit diagram of a conventional antenna switching module.
Figure 2:
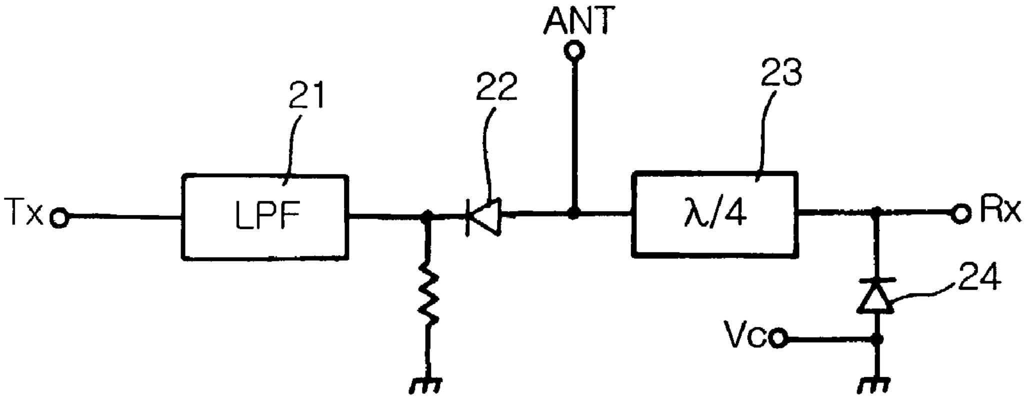
FIG. 2 PRIOR ART
FIG. 2 is a circuit diagram of another conventional antenna switching module.
Figure 3:
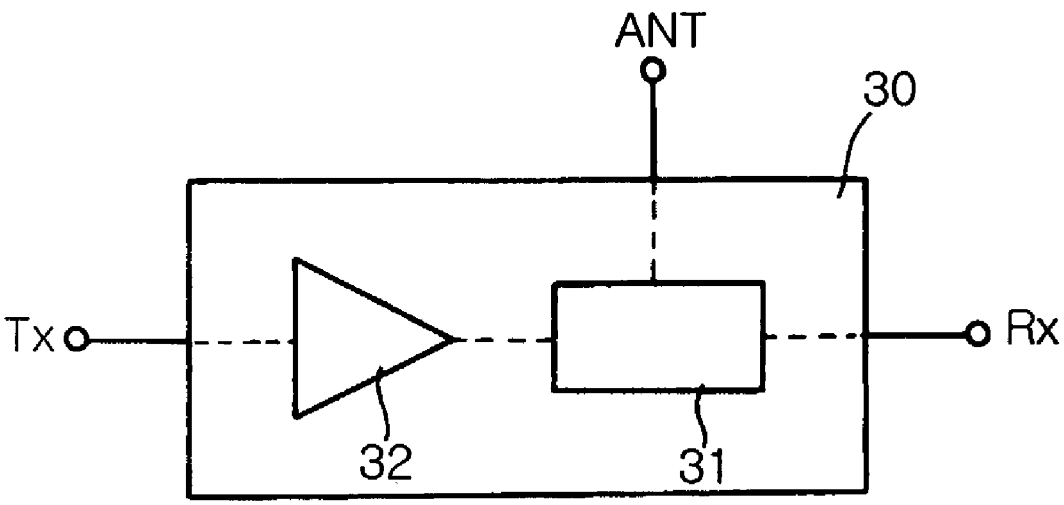
FIG. 3 PRIOR ART
FIG. 3 is a block diagram of a conventional front end module in which a power amplifier and an antenna switching module are implemented as a single module.

In the above construction, the switching diode 44 can be constructed such that its cathode is connected to the transmission line 43 and its anode is grounded, as in the case of a conventional antenna switching module shown in FIG. 2. In this case, a direction of the inputted control signal is opposite to that of a case where the switching diode 44 is connected as shown in FIG. 4.

As described above, the antenna switching module of the present invention is implemented in a structure similar to that of a basic antenna switching module. However, the antenna switching module is implemented using a switching device with an amplification function, capable of simultaneously performing signal amplification and switching operations, and a bias circuit for driving the switching device, instead of a switching diode performing only simple switching on/off operations at a transmission terminal TX. The switching device with the amplification function can be, for example, an active element, such as a Bipolar Junction Transistor (BJT) and a Field Effect Transistor (FET).

Further, the operation of the antenna switching module of the present invention is described in detail. Similarly to the conventional antenna switching module, if the switching means 41 having the amplification function and the switching diode 44 are turned off, a signal path ranging from the antenna terminal ANT to the reception terminal RX is formed, so a reception frequency signal received through the antenna terminal ANT is outputted to the reception terminal RX through the transmission line 43. At this time, only the reception frequency signal passes through the transmission line 43 having a length of λ/4 (λ: wavelength of the reception signal), and signals of frequency bands excepting a band of the reception frequency signal are intercepted by the transmission line 43.

On the contrary, if the switching means 41 having the amplification function and the switching diode 44 are turned on, a signal path ranging from the transmission terminal TX to the antenna terminal ANT is formed, so a transmission signal inputted through the transmission terminal TX is outputted to the antenna terminal ANT through the switching means 41 having the amplification function and the low pass filter 42. At this time, the switching means 41 having the amplification function amplifies the input transmission signal with a preset gain. Further, the low pass filter 42 eliminates harmonic frequency components generated from the transmission terminal TX and allows only a signal of a transmission frequency band to pass therethrough, similarly to the conventional antenna switching module. Therefore, the transmission signal inputted from the transmission terminal TX is amplified to a predetermined level and then radiated through the antenna terminal ANT.

Therefore, when the antenna switching module of the present invention is applied, a power amplifier module arranged in a previous stage of the antenna switching module needs only output a transmission signal having a level as low as a gain provided from the switching means 41 having the amplification function. Therefore, a burden of the power amplifier module can be reduced in proportion to the transmission signal having the low level. Moreover, if active elements are connected to each other in multiple stages in the switching means 41 having the amplification function to satisfy a required transmission level, it may even be possible for the power amplifier module to be removed.

Accordingly, the antenna switching module according to the present invention provides an effect that the functions of both antenna switching module and power amplifier module can be performed together using only a basic antenna switching construction.

In the above description, a basic construction of the antenna switching module is described to explain a basic principle of the present invention. Hereinafter, the construction and operation of the present invention is described with reference to embodiments.

Figure 5:
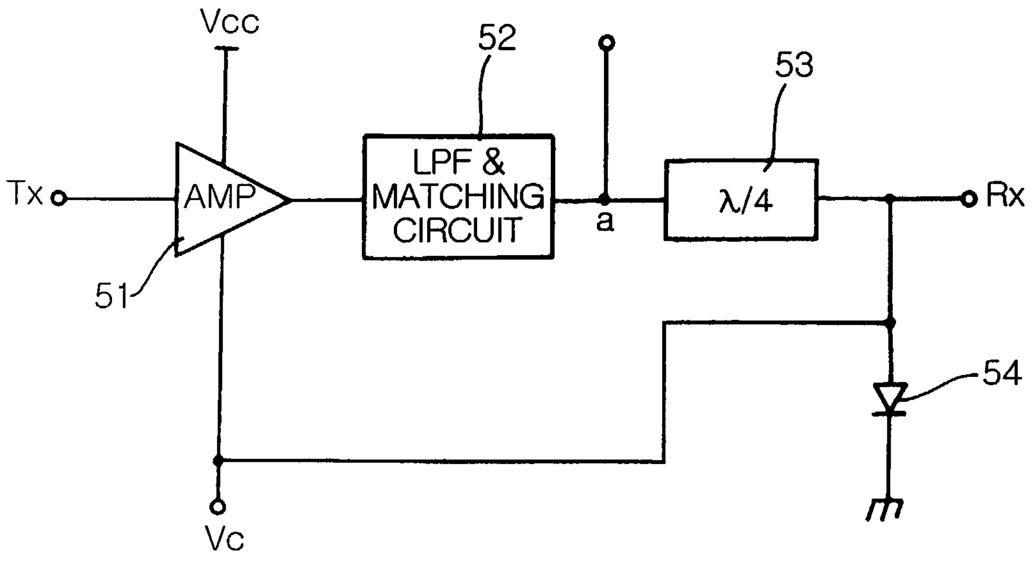
FIG. 5 is a circuit diagram showing a basic construction of the antenna switching module according to the present invention.

FIG. 5 is a block diagram showing the construction of the antenna switching module according to the present invention. Referring to FIG. 5, the antenna switching module comprises an amplifier 51, a low pass filter (LPF) and matching circuit unit 52, a transmission line 53, and a switching diode 54. The amplifier 51 is comprised of an active element and a bias circuit which drives the active element to be turned on/off in response to a control signal Vc and determines an amplification factor. The LPF and matching circuit unit 52 is disposed between the amplifier 51 and the antenna terminal ANT to eliminate harmonic frequency components included in an output signal of the amplifier 51 and perform signal matching. The transmission line 53 has a length of λ/4 (λ: wavelength of a reception signal) and connects the antenna terminal ANT and the reception terminal RX to each other. The switching diode 54 is disposed between one end of the transmission line 53, connected to the reception terminal RX, and the ground, and is switched on/ff in response to the control signal Vc.

In the above construction, the amplifier 51 can be implemented as a single active element, and can also be implemented as a multi-stage amplifier in which two or more active elements are connected in cascade. However, the bias circuit must be constructed to allow an operating mode of the active element generating energy to be switched to a forward active mode or cutoff mode in response to the control signal Vc.

The manner of implementing an amplification circuit using such active elements and passive elements, such as resistors, capacitors and coils, is generally well known in the electrical circuit field. Further, any conventional amplification circuits can be used if the amplification circuits have both the amplification function and the switching on/off function required in the present invention. Further, the amplifier 51 amplifies an input signal with a gain set by the bias circuit when the active element is turned on. A bipolar junction transistor, a field effect transistor, and other transistors can be used as the active element constituting such an amplifier 51.

Further, in the LPF and matching circuit unit 52, the low pass filter (LPF) is a means for preventing harmonic frequency components, which can be generated from the transmission terminal TX, from flowing into the antenna terminal ANT, similarly to the conventional antenna switching module. Further, the LPF can be disposed between the antenna terminal ANT and a connection contact point "a" of the transmission and reception terminals TX and RX. Further, the matching circuit matches its impedance with an output impedance of the amplifier 51 to attenuate signal loss, and can be implemented together with a low pass filter, or together with the bias circuit in the amplifier 51.

In FIG. 5, the amplifier 51 and the switching diode 54 are turned on or off in response to the control signal Vc. For example, if a high level voltage is applied as the control signal Vc, both the amplifier 51 and the switching diode 54 operate in a forward active mode, and are turned on. On the contrary, if a low level voltage is applied as the control signal Vc, both the amplifier 51 and the switching diode 54 operate in a cutoff mode and are turned off. Switching operations of the antenna switching module, relating to the turned on/off states of both the amplifier 51 and the switching diode 54, are the same as those of the conventional antenna switching module.

The antenna switching module of FIG. 5 described above is constructed such that respective circuits are implemented as a single chip.

Figure 6:
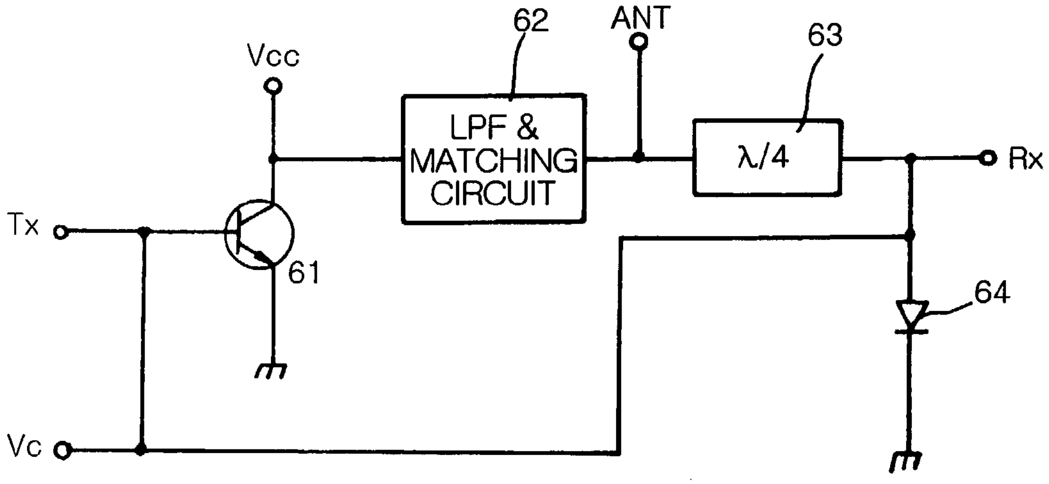
FIG. 6 is a view showing the construction of an antenna switching module implemented using a bipolar transistor according to an embodiment of the present invention.
Figure 7:
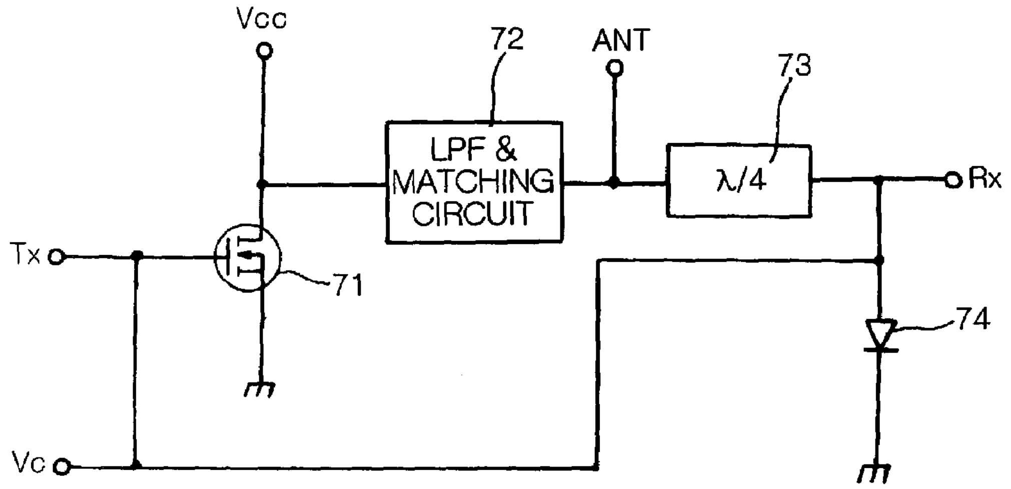
FIG. 7 is a view showing the construction of an antenna switching module implemented using a field effect transistor according to another embodiment of the present invention.

FIGS. 6 and 7 are views showing the embodiments of the antenna switching module of FIG. 5, respectively. That is, FIG. 6 shows an antenna switching module implemented using a bipolar junction transistor, and FIG. 7 shows an antenna switching module implemented using a field effect transistor.

Referring to FIG. 6, the antenna switching module according to a first embodiment of the present invention uses a bipolar junction transistor 61 as the amplifier 51 of FIG. 5. In this case, the bipolar junction transistor 61 is constructed such that its base is connected to both the transmission terminal TX and an input terminal of the control signal Vc, its collector is connected to both an operating power source Vcc and an input terminal of the LPF and matching circuit 62, and its emitter is connected to the ground.

Generally, a bipolar junction transistor is a three-terminal device having an emitter, a base and a collector, and is also called a bipolar transistor or junction transistor. The bipolar transistor is formed by two junctions sharing a common semiconductor layer. In this case, there are four operating modes according to biasing directions of respective junctions.

The operating modes of such a bipolar junction transistor are described in brief. If an emitter-base junction is forward biased, and a collector-base junction is reverse biased, the bipolar transistor is operated in a forward active mode. Therefore, the variation of an emitter-base bias level $V_{BE}$ adjusts an emitter current $I_E$, and a collector current $I_C$ is adjusted depending on the emitter current $I_E$. Accordingly, the bipolar transistor can be used as an amplifier.

Next, if both the emitter-base junction and the collector-base junction are reverse biased, the operating mode is called a cutoff mode, and the bipolar transistor operates in a similar manner as an open switch. On the contrary, if both the emitter-base junction and the collector-base junction are forward biased, the operating mode is called a saturation mode, and the state of the bipolar transistor is the same as a closed switch.

Furthermore, if the emitter-base junction is reverse biased, and the collector-base junction is forward biased, a corresponding bipolar transistor is operated in a reverse-active or inverted mode, and this operating mode is applied to an analog switching circuit or digital circuit.

The present invention uses the forward active mode and the cutoff mode of the bipolar transistor. The bipolar transistor 61 is controlled to operate as an amplifier or open switch by switching the emitter-base junction to be forward biased or reverse biased after the collector-base junction of the bipolar transistor 61 arranged in the antenna switching module is reverse biased.

That is, as shown in FIG. 6, the collector of the bipolar transistor 61 is connected to both the power source Vcc and the LPF and matching circuit unit 62, the emitter thereof is connected to the ground, and the base thereof is connected to both the transmission terminal TX and the control signal Vc input terminal. Therefore, if a signal of approximately 0 V is applied as the control signal Vc, the emitter-base junction is reverse biased, so the bipolar transistor 61 is operated in the cutoff mode. At this time, the bipolar transistor 61 does not transmit a transmission signal applied to the base to the collector, as in the case of an open switch. On the contrary, if a predetermined level voltage (for example, 4 V) is applied as the control signal Vc, the emitter-base junction is switched to be forward biased, so a transmission signal applied to the base from the transmission terminal TX is amplified and outputted at the collector. At this time, a voltage gain of an output signal to an input signal is determined according to passive elements (resistors, capacitors and coils) connected around the bipolar transistor 61. Therefore, an amplification factor of a signal is determined according to how the bias circuit of the bipolar transistor 61 is constructed. Further, the LPF and matching circuit unit 62, a transmission line 63 and a switching diode 64 operate in the same manner as the LPF and matching circuit unit 52, the transmission line 53 and the switching diode 54 of FIG. 5, respectively.

Next, referring to FIG. 7, the antenna switching module according to a second embodiment of the present invention uses a field effect transistor 71 as the amplifier 51 of FIG. 5.

Generally, the field effect transistor is constructed such that a drain and a source are formed at both ends of a n-type or p-type semiconductor bar by Ohmic contacts, and a gate is formed to electrically connect two thin $p^+$ or $n^+$ regions formed on the semiconductor bar. At this time, a semiconductor region between two gate regions is called a channel, through which a plurality of carriers move between the source and the drain. That is, the field effect transistor can control a current between the source and the drain according to a voltage between the gate and the source.

Such a field effect transistor has four operating regions including Ohm, saturation, breakdown and cutoff regions similarly to the above-described bipolar transistor. Respective operating regions are described in brief.

The Ohmic region is also called a voltage-variable resistor region. In this region, the field effect transistor acts like a resistor whose resistance value is determined by a gate-source voltage $V_{GS}$, wherein a drain current $I_D$ vs. a drain-source voltage $V_{DS}$ characteristic decreases according to the increase of $|V_{GS}|$. The saturation region is also called a pinch-off region. In this region, a drain current $I_D$, obtained when a drain-source voltage $V_{DS}$ is increased to be greater than a pinch off voltage after a predetermined $V_{GS}$ is applied, is constantly maintained regardless of the drain-source voltage $V_{DS}$. At this time, the drain current $I_D$ depends on a reverse biased gate-source voltage $V_{GS}$. Next, the breakdown region is a region in which avalanche breakdown occurs in a gate junction to allow the drain current $I_D$ to be infinite. In this case, a drain-source voltage causing the avalanche breakdown varies according to a gate-source voltage. Moreover, the cutoff region is a region satisfying a condition of $|V_{GS}|>|V_P|$, wherein $V_P$ is a pinch off voltage. In this region, the drain current $I_D$ becomes approximately “0”, so the field effect transistor is in the same state as an open switch.

The present invention uses the cutoff and saturation regions of the above-described operating regions of the field effect transistor. As described above, switchover between the cutoff and saturation regions can be achieved by adjusting the gate-source voltage $V_{GS}$.

In the antenna switching module of the present invention, the field effect transistor 71 is constructed such that its gate is connected to both the transmission terminal TX and a control signal Vc input terminal, its drain is connected to a LPF and matching circuit unit 72, and its source is connected to the ground. A gate-source voltage $V_{GS}$ of the field effect transistor 71 is adjusted in response to the control signal Vc, such that the field effect transistor 71 performs a cutoff operation or amplification operation.

Moreover, the LPF and matching circuit unit 72, a transmission line 73 and a switching diode 74 are operated in the same manner as the LPF and matching circuit unit 52, the transmission line 53 and the switching diode 54 of FIG. 5, respectively.

Figure 8:
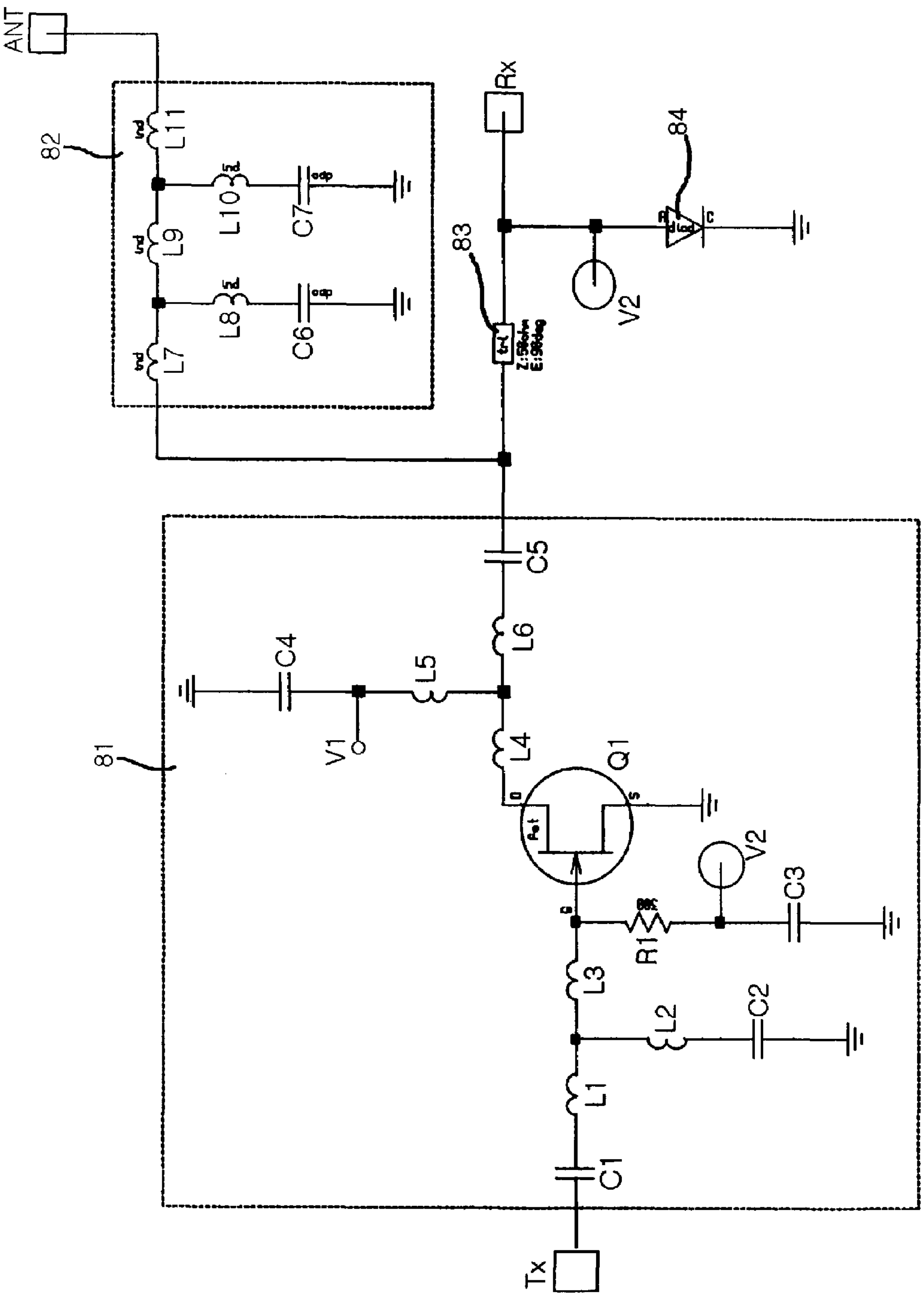
FIG. 8 is a detailed circuit diagram of the antenna switching module according to an embodiment of the present invention.

FIG. 8 is a detailed circuit diagram of the antenna switching module implemented according to the second embodiment of the present invention shown in FIG. 7. In the antenna switching module, an amplifier 81 comprises a field effect transistor Q1, capacitors C1 to C5, coils L1 to L6, and a resistor R1. The field effect transistor Q1 has a gate connected to the transmission terminal TX, a source connected to the ground, and a drain connected to both a LPF 82 and a transmission line 83. The capacitor C1 and the coils L1 and L3 are connected in series with each other between the gate of the transistor Q1 and the transmission terminal TX. The coil L2 and the capacitor C2 are connected in series with each other between a contact point of the coils L1 and L3 and the ground. The resistor R1 and the capacitor C3 are connected in series with each other between the gate of the transistor Q1 and the ground, wherein a control signal V2 is applied to a contact point of the resistor R1 and the capacitor C3. The coils L4 and L6 and the capacitor C5 are connected in series with each other between the drain of the transistor Q1 and the low pass filter 82. The coil L5 and capacitor C4 are connected in series with each other between a contact point of the coils L4 and L6 and the ground, wherein a first control signal V1 is applied to a contact point of the coil L5 and the capacitor C4.

As shown in FIG. 8, the low pass filter 82 is comprised of a plurality of coils L7 to L11 and capacitors C6 and C7 connected in the shape of π between the amplifier 81 and the antenna terminal ANT.

Further, one end of the transmission line 83 having a length of λ/4 (λ: wavelength of a reception signal) is commonly connected to the low pass filter 82 and the amplifier 81, and the other end thereof is commonly connected to the reception terminal RX and an anode of the switching diode 84. Further, the switching diode 84 has a cathode connected to the ground, and an anode to which the control signal V2 is applied.

The operation of the antenna switching module having the above construction is described in detail. If a high level voltage signal is applied as the control signal V2 while a constant voltage (operating power) is continuously applied as the control signal V1, the field effect transistor Q1 is operated in a saturation region to generate a drain current $I_D$ proportional to a drain-source voltage obtained by the control signal V1. Accordingly, a transmission signal inputted through the transmission terminal TX is amplified and outputted by the transistor Q1, and the amplified transmission signal is transmitted to the antenna terminal ANT through the low pass filter 82. In this case, the transmission signal outputted from the amplifier 81 is not transferred to the reception terminal RX through the transmission line 83 having a length of ¼ of a wavelength (λ) of a reception signal. Further, the switching diode D2 is turned on in response to the high level control signal V2, thus bypassing a reception signal received through the antenna terminal ANT to the ground.

On the contrary, if a low level control signal V2 is applied, the transistor Q1 is operated in the cutoff region, so its state is the same as an open switch. Therefore, a transmission signal inputted from the transmission terminal TX is not transferred to the antenna terminal ANT. Further, the switching diode 84 is turned off in response to the low level control signal V2, so a reception signal received through the antenna terminal ANT is outputted to the reception terminal RX through the transmission line 83.

Figure 9A:
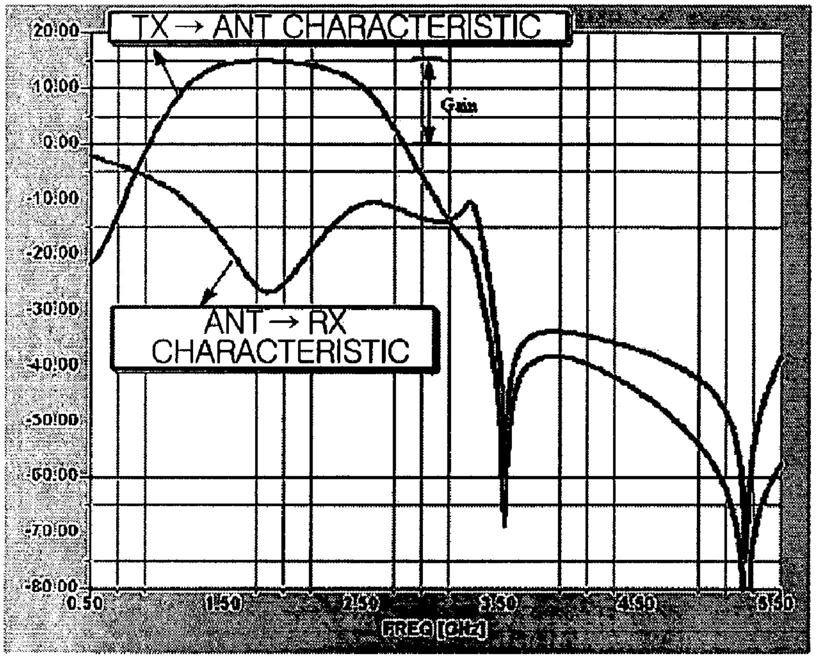
FIGS. 9A and 9B are graphs showing operating characteristics of the antenna switching module of the present invention.
Figure 9B:
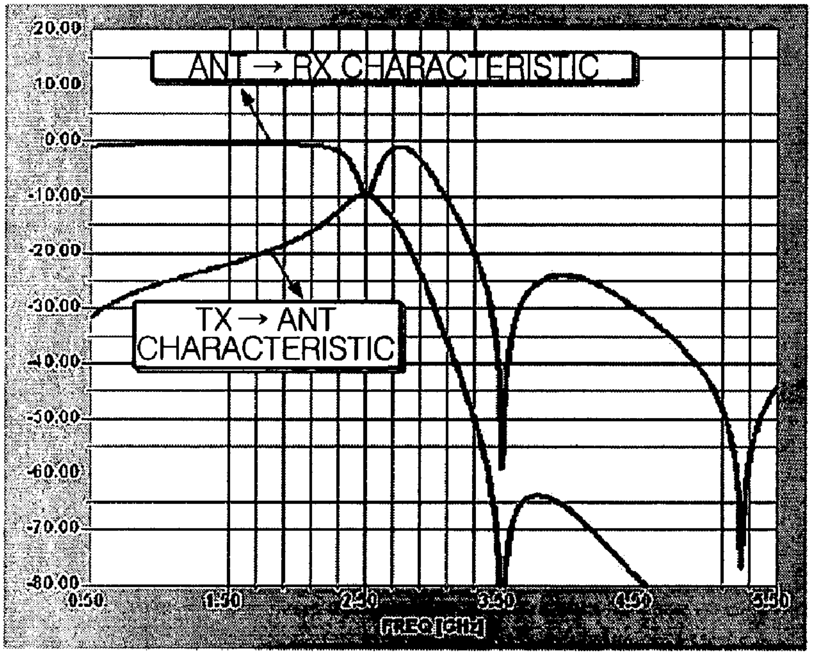

FIGS. 9A and 9B are graphs showing results obtained by measuring operating characteristics of the antenna switching module in which a center frequency of a transmission band is 1747.5 MHz and a center frequency of a reception band is 1842.5 MHz, wherein the antenna switching module is implemented as shown in FIG. 8. FIG. 9A shows signal transmission characteristics measured when a high level voltage is applied as the control signal V2, that is, when the antenna switching module is operated in a transmission mode. In this case, a signal transferred to the antenna terminal ANT from the transmission terminal TX had a gain equal to or greater than +10 dB in a band of approximately 75 MHz on the basis of the transmission band center frequency of 1747.5 MHz. On the contrary, a signal transferred to the reception terminal RX from the antenna terminal ANT indicated attenuation characteristics less than or equal to approximately −20 dB in the reception band.

On the other hand, FIG. 9B is a graph showing signal transmission characteristics measured when a low level voltage is applied as the control signal V2, that is, when the antenna switching module is operated in a reception mode. In this case, a signal transferred to the reception terminal RX from the antenna terminal ANT did not indicate attenuation characteristics in a band of approximately 75 MHz on the basis of the reception band center frequency of 1842.5 MHz. However, signals transferred to the antenna terminal ANT from the transmission terminal TX indicated attenuation characteristics of several tens dB.

Referring to the graphs of FIGS. 9A and 9B, it can be seen that the antenna switching module of the present invention sends a transmission signal to the antenna terminal by amplifying the transmission signal to a higher level, and sends a reception signal to the reception terminal RX without attenuation.

Additionally, in the constructions of FIGS. 5 to 8, the switching diodes 54, 64, 74 and 84 can be constructed such that each of their cathodes is connected to the transmission line 23 and each of their anodes is connected to the ground, as shown in FIG. 2. At this time, the control signal Vc is applied to each of the anodes thereof, similarly to FIG. 2.

As described above, the present invention provides an antenna switching module having an amplification function, which can amplify and output a transmission signal only using the antenna switching module without using a power amplifier module. As a result, the present invention is advantageous in that it adjusts an amplification factor in the antenna switching module, such that the burden of a power amplifier module can be reduced, or the power amplifier module itself can be unnecessary, thus reducing the number of parts mounted on mobile terminals and consequently reducing the costs of mobile terminals and miniaturizing the mobile terminals.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An antenna switching module having an amplification function for selectively connecting an antenna terminal to any of a transmission terminal and a reception terminal, comprising:

an amplifier implemented using at least one active element and a bias circuit to intercept or amplify a transmission signal applied through the transmission terminal, the bias circuit driving the active element to be turned on/off in response to a control signal and determining an amplification factor;

a low pass filter and matching circuit unit disposed between the amplifier and the antenna terminal to eliminate harmonic frequency components included an output signal of the amplifier and perform signal matching;

a transmission line having a length of ¼ of a wavelength (λ) of a reception signal to connect the antenna terminal and the reception terminal to each other; and a switching diode disposed between a first end of the transmission line, connected to the reception terminal, and the ground, and switched on/ff in response to the control signal.

2. The antenna switching module having an amplification function according to claim 1, wherein said amplifier uses one or more bipolar junction transistors connected to each other as the active element for switching and amplification.

3. The antenna switching module having an amplification function according to claim 1, wherein said amplifier uses one or more field effect transistors connected to each other as the active element for switching and amplification.

4. The antenna switching module having an amplification function according to claim 1, wherein said low pass filter and matching circuit unit is constructed such that:

a low pass filter is disposed between said antenna terminal and a contact point of said amplifier and said transmission line, and a matching circuit is connected to an output terminal of the amplifier.

5. An antenna switching module having an amplification function for selectively connecting an antenna terminal to any of a transmission terminal and a reception terminal, comprising:

an amplification circuit unit constructed such that a first capacitor and first and third coils are connected in series to the transmission terminal, a contact point of the first and third coils is grounded through a second coil and a second capacitor connected in series with each other, a first end of the third coil is connected to a gate of a transistor and is grounded through a first resistor and a third capacitor, a second control signal is applied to a contact point of the first resistor and the third capacitor, fourth and sixth coils and a fifth capacitor are connected in series to a drain of the transistor, a contact point of the fourth and sixth coils is grounded through a fifth coil and a fourth capacitor, and a first control signal is applied to a contact point of the fifth coil and the fourth capacitor;

a low pass filter unit constructed such that seventh, ninth and eleventh coils are connected in series with each other between the fifth capacitor of the amplification circuit unit and the antenna terminal, a contact point of the seventh and ninth coils is grounded through an eighth coil and a sixth capacitor, and a contact point of the ninth and eleventh coils is grounded through a tenth coil and a seventh capacitor;

a transmission line for connecting a first end of the seventh coil of the low pass filter unit and the reception terminal with each other, the transmission line having a length of ¼ of a wavelength (λ) of a reception signal; and a switching diode constructed such that its anode is connected to a first end of the transmission line, its cathode is grounded, and the second control signal is applied to the anode.

* * * * *